Patented Aug. 23, 1932

1,873,165

UNITED STATES PATENT OFFICE

JOHN CHARLES WALKER, OF TALLANT, OKLAHOMA, ASSIGNOR TO EMPIRE OIL AND REFINING COMPANY, OF DOVER, DELAWARE, A CORPORATION OF DELAWARE

METHOD OF AND REAGENT FOR TREATING WET OILS

No Drawing.   Application filed January 27, 1928.   Serial No. 250,092.

This invention relates to the treatment of wet oils, and more particularly to a method of and chemical reagent for treating petroleum oil associated with natural water to prevent the formation of resistant BS emulsions of the water-in-oil type and to resolve any emulsions of the above character previously formed.

The invention herein described is a continuation in part of and an improvement on that described in my co-pending application, Ser. No. 194,845.

One object of the present invention is to provide an improved method of and chemical reagent for treating oil-water mixtures to inhibit the formation of emulsions of the water-in-oil type and to resolve such emulsions into their several constituents in cases where they have already formed.

In my co-pending application above referred to I have described a method for treating oil-water mixtures to inhibit the formation of oil-water emulsions and to resolve such emulsions involving the use of a chemical reagent containing a polycyclic aromatic nucleus to which one or more alkyl, aryl, or aralkyl radicals and one or more strongly polar sulfonic acid groups have been added by substitution in the nucleus in place of a corresponding number of hydogen atoms. One of the specific treating agents referred to in my co-pending application is the ammonium salt or soap like material formed by neutralizing with ammonia the reaction product of the "coupling" sulphuric acid treatment of a mixture of crude naphthalene sulfonic acids and commercial isopropyl alcohol.

Another object of the present invention is to provide a liquid chemical treating agent for oil-water mixtures which shall be more effective in inhibiting and resolving water and oil emulsions than reagents now employed for such purposes and which shall also have satisfactory low cold test properties enabling its satisfactory use at temperatures at or below the freezing point of water.

With these and other objects and features in view the invention consists in the method of and reagent for treating oil-water mixtures hereinafter described and more particularly defined in the claims.

Essentially the method of treating oil-water mixtures forming the subject of the present invention consists in subjecting oil associated with fresh or salt water in an emulsified or unemulsified state to the action of a liquid chemical treating agent containing as its principal component a substituted hydrocarbon derivative of a polycyclic sulfo-aromatic compound, such as that comprising the preferred treating agent of my aforementioned application, and also containing cresylic acid, or a mixture of cresylic acid and fresh or salt water, or a mixture of cresylic acid, water and certain other low-freezing-point hydrocarbons or hydrocarbon derivatives. The following is a specific example of a concentrated treating agent of the class forming the subject of the present invention:

A homogeneous liquid mixture containing the ammonium salt of a crude isopropyl naphthalene sulfonic acid, together with about 10-20% of the weight of such salt each of water, cresylic acid and isopropyl alcohol.

The specific reagent, the composition of which is outlined above, may be prepared as follows:

Commercial naphthalene is sulfonated with an excess of concentrated (66° Bé.) sulfuric acid added slowly and with vigorous stirring under conditions yielding a mixture of alpha- and beta-naphthalene mono-sulfonic acid, with the beta acid largely predominating (about 85% beta and 15% alpha acids). The temperature of this sulfonation is maintained within a range of from 170° C. to 176° C. throughout a four-hour period, with constant agitation of the reaction mixture.

The reaction product of this sulfonation treatment is used without purification in preparing the principal or basic component of the de-emulsifying and emulsion-inhibiting reagents of the present invention. In addition to the alpha- and beta-naphthalene monosulfonic acids this reaction mass contains small amounts of unchanged naphthalene, free sulfuric acid and other sulfonation products. To every twenty parts by weight of the above sulfonation mass there is added fifteen parts of isopropyl alcohol and fifteen parts of concentrated sulfuric acid (sp. gr. 1.84), this second sulphuric acid treatment being carried on at a temperature of 88° C. to 90° C. with continuous agitation. The best method of carrying on this second sulphuric acid treatment for the purpose of effecting the substitution or coupling of one or more isopropyl groups in place of one or more hydrogen atoms in the naphthalene nucleus appears to be as follows:

Five parts of the isopropyl alcohol are first added very slowly to the sulfonation mass resulting from the above primary sulfonation treatment of naphthalene. After allowing a short interval for thorough mixing five parts of concentrated sulfuric acid are slowly added to the mixture thus formed. After the dehydration and coupling reaction thus set up has proceeded for about one half hour an additional five parts each of the alcohol and of the sulfuric acid are added in the same manner followed in the first addition step of the treatment. After the reaction has proceeded for another half hour period a third addition of isopropyl alcohol and sulfuric acid is made in the same manner as before. After this final addition of alcohol and sulfuric acid the reaction mass is maintained at the desired temperature of 88° C. to 90° C. for an additional two hours with constant agitation, so that the total time required to complete this second sulfonation and "coupling" treatment comprises three hours. The time of sulfonation and coupling may be considerably modified by the physical equipment used, the speed of agitation, and numerous other factors. Depending upon the capacity of the apparatus from three to eight hours may be required to complete the coupling reaction. Any increase in efficiency of agitation or in speed of starting will tend to cut down the time required for proper coupling. In general the coupling reaction may be recognized as complete when a test sample removed from the violently agitated mass, rapidly and sharply separates an upper "oily layer" and lower "acid layer." The reaction product of this second sulfuric acid treatment is passed while still hot into a separatory vessel and is maintained in a quiescent state therein until a complete separation into two layers takes place. The lower layer consists of unchanged naphthalene sulfonic acid, sulfuric acid, isopropyl alcohol, water and other reaction products of the alcohol and sulfuric acid, including small amounts of polymers of the type of propylene polymers. The upper oil layer is the desired "coupled" product which will be hereinafter referred to as isopropyl naphthalene sulfonic acid. To make up the aforementioned specific treating agent there is added to this free oily layer, that is to the isopropyl naphthalene sulfonic acid, about 15% of its weight of water, about 15% of its weight of commercial cresylic acid and sufficient aqueous ammonia solution to effect a complete neutralization of the "coupled" product. After adding a small amount of water to the mixture thus formed there is finally added about 15% by weight of the coupled product of commercial isopropyl alcohol, the final mixture thus formed being thoroughly agitated. Sometimes on suspending agitation it will be found that a watery layer comprising about 10% by weight of the total mixture separates from the mixture, and if such is the case this watery layer is drawn off and discharged or subsequently used again in making up another batch of the treating agent. The exact composition of this treating agent is not definitely known but it is believed to be a homogeneous solution or mixture of cresylic acid, isopropyl alcohol, water, ammonium salts of mono-, di-, tri-, tetra-, and perhaps even higher isopropyl derivatives of alpha- and beta-naphthalene sulfonic acids (with the di-isopropyl beta naphthalene mono-sulfonic acid salt predominating), together with small amounts of ammonium sulfate, propylene polymers (including disopropylene) and other apparent impurities formed during the preparation of the treating agent.

In the practical application of the liquid chemical reagent of the present invention to the treatment of oil-water mixtures, particularly mixtures of petroleum oil and natural waters, it is preferred to inject the concentrated reagent, or a dilute (as low as 1%) fresh or salt water solution or suspension or a colloidal solution or suspension in oil thereof, into the casinghead of the particular oil well giving trouble from formation of BS emulsions, or of a well adjacent to the producing well, continuously or intermittently during the period in which oil is being removed from the well. However, in cases where it is found more practicable to treat the wet oil after it has been taken from the well and after the BS emulsions have formed by reason of agitation set up in the well, this may be done by injecting a predetermined amount of treating agent into the pipe line leading from the well during the period in which the well is in operation, or by admixing suitable amounts of the treating agent, preferably together with some brine (or followed by a brine wash) with the wet oil, after it has been separated by gravity settling from the non-emulsified portion of its oil-water content, in settling tanks adjacent to the well casing. Where the treatment is carried on above ground the chief function of the treating agent will be to resolve BS emulsions which are already formed, whereas in carrying on the treatment within the well the chief function of the treating agent will be to condition the oil-water mixture so as to inhibit the formation of BS emulsions of the oil-water type. In certain cases it may be found advantageous to carry out the de-emulsification treatment in a treating tank fitted up with agitators and a steam heating coil. Thus by increasing the temperature of the oil under treatment its viscosity is correspondingly lowered, with the result that the effectiveness of the treating agent in actively breaking down the emulsion is increased, and the rate at which the water liberated from the emulsion, and any brine used during the treatment as a wash, settles to the bottom of the treating tank, is also increased.

It has been found that a concentrated solution of the specific treating agent above referred to will break the most stubborn BS emulsions when used in amounts of less than 1% by volume of the wet oil treated. In general less than ½% by volume of the concentrated treating agent will effectively inhibit the formation of such BS emulsions.

The specific concentrated treating agent above described, and also the modification thereof hereinafter referred to, are soluble in water, including salt-water, in the amounts which it is necessary to use for effectively treating wet oils in accordance with the method of the present invention. Furthermore the alkaline earth salts of the present treating agents are sufficiently water-soluble so that the amount of such salts formed during the treatment of the wet oils with the requisite amounts of treating agent, including the calcium and magnesium salts, are not precipitated and accordingly have no stabilizing effect on the emulsion component of the wet oil under treatment.

It has been observed that the liquid treating agents employed in accordance with the method of the present invention have a rapid initial lowering effect on the surface tension of any water with which they are brought in contact. It is believed, therefore, that the action of these treating agents in inhibiting formation of oil-water emulsions and breaking down such emulsions is chiefly of a physical or a physico-chemical character,—that is, largely the result of surface tension effects. However, it is to be understood that the invention is not based or dependent upon or limited to any theory except such as is specifically set forth in the accompanying claims.

While the specific treating agent described above consists of a homogeneous liquid solution or mixture of cresylic acid, isopropyl alcohol, water, ammonium salts of isopropyl naphthalene sulfonic acids and small amounts of other constituents, it has been found that other materials may be used in place of certain of the ingredients of the above treating agent without materially effecting the advantageous physical and chemical properties of the specific reagent, or the effectiveness or manner of its application to the treating of wet oils. Thus the basic component of the specific reagent above described may have an anthracene, naphthol, chlornaphthalene or other polycyclic aromatic nucleus to which there has been added by substitution one or more hydrocarbon radicals, derived, for example, from a primary or secondary butyl alcohol by the "coupling" sulfuric acid treatment of a mixture of such alcohol and the sulfonic acid derivative of said polycyclic aromatic compound. Likewise the sodium, calcium or other neutral salts of such substituted polycyclic aromatic sulfonic acids may be used in place of the ammonium salt constituting the basic component of the specific reagent. Moreover halogen, hydroxy or amino-derivatives of propane, butane and other hydrocarbons may be coupled to the polycyclic aromatic nucleus of the basic component of the treating agent in place of the isopropyl radical coupled to the specific reagent above referred to.

While cresylic acid is named as the principal freezing-point depressing component of the specific treating agent above described, the isopropyl alcohol also plays an important part in this respect, and the advantageous physical and chemical properties of the specific treating agent are believed to be in part at least due to the properties imparted to it by its cresylic acid and isopropyl alcohol components. It has been found that hexyl alcohol, or a mixture of butyl, amyl and hexyl alcohols, or benzyl alcohol, may be used in place of the isopropyl alcohol component of the aforementioned specific treating agent, and in the case of the hexyl alcohol at least, such substitution is advantageous if it can be effected without too much increased cost, for the reason that the hexyl alcohol apparently acts as a complete solvent for the basic component of the treating agent, and its use therefore permits the cresylic acid and water components of the specific agent to be dispensed with, if desired. In general it is believed that almost any acid- or alkali-soluble hydroxy derivative of an aliphatic or aromatic hydrocarbon which is a liquid at ordinary temperatures and has a low freezing point, or a mixture of two or more of such compounds, may be substituted for the cresylic acid and isopropyl alcohol components of the specific reagent heretofore described. In general the higher alcohols such as hexyl alcohol are much more effective and satisfactory than the lower alcohols such as ethyl alcohol. Likewise it has been found that the isopropyl alcohol component of the specific reagent may be replaced by toluene, cymene, or similar low-freezing point monocyclic aromatic hydrocarbons having an alkyl side-chain.

Examples of the composition of suitable modifications of the specific treating agent already given, are as follows:

*Example 1*

The liquid low freezing point mixture formed by adding to about twenty five pounds of the crude isopropyl naphthalene sulfonic acids obtained as a top layer product of the "coupling" sulfuric acid treatment previously described, about four pounds of water, about four pounds of commercial cresylic acid and sufficient aqueous ammonia solution to neutralize the acidity of the resulting mixture. The mixture is then made up to a total weight of about forty four pounds by adding more water thereto, after which about four pounds of isopropyl alcohol is stirred in, and in the event of the separation of a watery layer on standing, such watery layer, (which may comprise up to six pounds by weight) is drawn off and discarded. The reagent thus prepared is free flowing and does not separate crystals or solidify at temperatures well below the freezing point of water. It lathers freely with the hard waters associated with wet petroleum oils treated therewith without causing precipitation of insoluble alkaline earth salts from hard water, the solution merely becoming somewhat opalescent at times due to the presence of a small amount of propylene polymers (formed during the "coupling" treatment) in the form of a colloidal suspension in the wet oil under treatment.

*Example 2*

A reagent prepared in the same way as described in Example 1 except that secondary hexyl alcohol or a crude mixture of primary and secondary butyl, amyl and hexyl alcohols, or other liquid fatty alcohol, is substituted for the isopropyl alcohol of Example 1, or for the cresylic acid and isopropyl alcohol of Example 1.

*Example 3*

A reagent prepared in the same way as Examples 1 and 2 above except that toluene or cymene is used in place of the isopropyl alcohol of Example 1, the proportions in each case remaining the same.

*Example 4*

A reagent prepared as in Examples 1 and 2 above, except that the cresylic acid component is omitted.

*Example 5*

A reagent prepared as in Example 1 above except that the isopropyl alcohol component is omitted.

Considering the effect of the several ingredients outlined above on the physical and chemical properties of the reagents, it is believed that the isopropyl naphthalene sulfonic acid or its salt (and the equivalents thereof) is the principal active ingredient of the reagent imparting emulsion-inhibiting and emulsion-resolving properties thereto. The cresylic acid, water, and liquid fatty alcohol and aromatic hydrocarbon components of the reagent apparently act as solvents for the basic component or as mediums for in some other way liquefying or changing the physical state of the original basic component (as for example the ammonium salt of isopropyl naphthalene sulfo acid) from that of a colloidal or crystalline solid at ordinary temperatures to that of a homogeneous liquid solution or mixture or colloidal suspension having no tendency to stratify or to separate crystals at temperatures in the neighborhood of, and in some cases below, the freezing-point of water. Due to the presence of these liquefying and freezing-point depressing components, therefore, the present treating agent can be very effectively used in a concentrated form and can be conveniently stored, transported and applied to the treatment of wet oil even under the severe weather conditions encountered in the oil fields during the winter months.

It has been found that the cresylic acid component of the reagents of the present invention apparently has a decided solvent action for the more water-soluble portions of the lower mono- and di-propylated naphthalene sulfo acids and their salts present in the specific treating agent first described. Moreover, the cresylic acid apparently acts to remove adsorbed oil from the finely divided solid matter or dirt which is often carried in suspension in BS emulsions treated with the reagent, thus allowing this dirt to settle out of the emulsion in the treating tank. This is an advantageous property of the present treating agents in that when the oil adsorbed on the dirt in the BS emulsion is not separated therefrom, the buoyancy of the adsorbed oil tends to raise the dirt to the top of the layer of water which is separated from the treated oil at the end of the treatment and thereby increases the difficulty of separating the water from the supernatant layer of treated oil. The liquid fatty alcohol and aromatic hydrocarbon components of the present treating agents apparently have a marked solvent action for the tri-, tetra-, and higher propylated derivatives of the naphthalene sulfonic acids and their salts, such higher propylated derivatives being less soluble than the lower propylated derivatives resulting from the treatment. For this reason it is believed that since the present reagents usually contain both cresylic acid and one or more of these low freezing-point alcohol or aromatic hydrocarbon solvents for different constituents of the basic component (such solvents being in most cases apparently mutually soluble) such cresylic acid and liquid alcohol or hydrocarbon solvents apparently cooperate to impart to the reagent the character of a homogeneous liquid solution which will not stratify or precipitate crystals at temperatures even below the freezing-point of water.

Although the method of treating oils and the reagents to be used have been described with particular reference to the treatment of petroleum oil-water mixtures to inhibit the formation of and resolve water-in-oil emulsions, it is to be understood that the method and the reagents of the invention are not limited to such use but may be effectively employed in the treatment of other mixtures of mineral, animal or vegetable oils and water while in an emulsified or unemulsified state.

The term "hydrocarbon substituted derivative of a polycyclic sulfo aromatic compound" has been used in the foregoing description and in the claims as a generic term to define a product having a polycyclic aromatic nucleus to which one or more alkyl, aryl or aralkyl radicals and one or more sulfonic acid or sulfonate groups have been added by substitution in the place of a corresponding number of hydrogen atoms originally attached to said nucleus.

The invention having been thus described, what is claimed as new is:

1. The method of treating an oil-water mixture to inhibit the formation of water-in-oil emulsions and to resolve any such emulsions previously formed, comprising subjecting said mixture to the action of a liquid chemical treating agent comprising a hydrocarbon substituted derivative of a polycyclic sulfo aromatic compound and a relatively small proportion of cresylic acid.

2. The method of treating an oil-water mixture to inhibit the formation of water-in-oil emulsions and to resolve any such emulsions previously formed, comprising subjecting said mixture to the action of a liquid chemical treating agent comprising a hydrocarbon substituted derivative of a polycyclic sulfo aromatic compound and a relatively small amount each of cresylic acid and a low freezing point liquid alcohol.

3. The method of treating an oil-water mixture to inhibit the formation of water-in-oil emulsions and to resolve any such emulsions previously formed, comprising subjecting said mixture to the action of a liquid chemical treating agent comprising a hydrocarbon substituted derivative of a polycyclic sulfo aromatic compound and a relatively small amount each of cresylic acid and a low freezing point liquid fatty alcohol.

4. The method of treating an oil-water mixture to inhibit the formation of water-in-oil emulsions and to resolve any such emulsions previously formed, comprising subjecting said mixture to the action of a liquid chemical treating agent comprising a hydrocarbon substituted derivative of a polycyclic sulfo aromatic compound and a relatively small amount each of a low freezing point liquid hydroxy derivative of a hydrocarbon and polymers of the type of propylene polymers.

5. The method of treating an oil-water mixture to inhibit the formation of water-in-oil emulsions and to resolve any such emulsions previously formed, comprising subjecting said mixture to the action of a liquid chemical treating agent comprising an ammonium isopropyl naphthalene sulfonate and a liquid low freezing point organic solvent therefor.

6. The method of treating an oil-water mixture to inhibit the formation of water-in-oil emulsions and to resolve any such emulsions previously formed, comprising subjecting said mixture to the action of a liquid chemical treating agent comprising an alkali-forming base salt of an isopropyl naphthalene sulfonic acid and up to 20% of its weight of cresylic acid.

7. The method of treating an oil-water mixture to inhibit the formation of water-in-oil emulsions and to resolve any such emulsions previously formed, comprising subjecting the oil-water mixture to the action of a liquid chemical treating agent comprising an alkali-forming base salt of an isopropyl naphthalene sulfonic acid and up to 20% of the weight of said salt each of cresylic acid, water and isopropyl alcohol.

8. The method of treating water-in-oil emulsion comprising, subjecting said oil to the action of a liquid chemical treating agent comprising a hydrocarbon substituted derivative of a polycyclic sulfo aromatic compound, and a brine wash, and separating the oil and water products of the treatment by subsidence.

9. The method of treating an oil-water mixture to inhibit the formation of water-in-oil emulsions and to resolve any such emulsions previously formed, comprising subjecting said mixture to the action of a liquid chemical treating agent comprising a hydrocarbon substituted derivative of a polycyclic sulfo aromatic compound and a low freezing point liquid organic solvent for said compound.

10. The method of treating an oil-water mixture to inhibit the formation of water-in-oil emulsions and resolve any such emulsions previously formed, comprising subjecting the oil-water mixture to the action of a liquid mixture of a hydrocarbon substituted derivative of a polycyclic sulpho aromatic compound and a fractional part of the weight of said compound of a low freezing point liquid hydroxy derivative of a hydrocarbon.

In testimony whereof I affix my signature.

JOHN CHARLES WALKER.